United States Patent
Houts et al.

(10) Patent No.: US 11,188,089 B2
(45) Date of Patent: Nov. 30, 2021

(54) LOCALIZATION FOR AUTONOMOUS VEHICLES USING GAUSSIAN MIXTURE MODELS

(71) Applicant: Ford Global Technologies, LLC, Dearborn, MI (US)

(72) Inventors: Sarah Houts, Sunnyvale, CA (US); Praveen Narayanan, San Jose, CA (US); Graham Mills, San Francisco, CA (US); Shreyasha Paudel, Sunnyvale, CA (US)

(73) Assignee: Ford Global Technologies, LLC, Dearborn, MI (US)

(*) Notice: Subject to any disclaimer, the term of this patent is extended or adjusted under 35 U.S.C. 154(b) by 682 days.

(21) Appl. No.: 16/014,855

(22) Filed: Jun. 21, 2018

(65) Prior Publication Data
US 2019/0391268 A1    Dec. 26, 2019

(51) Int. Cl.
| | | |
|---|---|---|
| *G01S 17/89* | (2020.01) | |
| *G01C 21/32* | (2006.01) | |
| *G01S 7/48* | (2006.01) | |
| *G05D 1/00* | (2006.01) | |
| *G05D 1/02* | (2020.01) | |

(52) U.S. Cl.
CPC ............ *G05D 1/024* (2013.01); *G01C 21/32* (2013.01); *G01S 7/4808* (2013.01); *G01S 17/89* (2013.01); *G05D 1/0088* (2013.01); *G05D 1/0274* (2013.01); *G05D 2201/0213* (2013.01)

(58) Field of Classification Search
CPC ........... G05D 1/024; G05D 2201/0213; G05D 1/0274; G05D 1/0088; G01S 17/89; G01S 7/4808; G01C 21/32
See application file for complete search history.

(56) References Cited

U.S. PATENT DOCUMENTS

| | | | |
|---|---|---|---|
| 8,537,338 B1* | 9/2013 | Medasani | G01C 21/32 356/4.01 |
| 8,612,135 B1 | 12/2013 | Montemerlo | |
| 9,081,385 B1* | 7/2015 | Ferguson | G05D 1/0246 |
| 9,170,334 B2 | 10/2015 | Baldwin | |
| 2008/0033645 A1 | 2/2008 | Levinson | |
| 2008/0114721 A1* | 5/2008 | Jones | G06F 16/3338 |
| 2016/0209846 A1 | 7/2016 | Eustice | |
| 2017/0344015 A1 | 11/2017 | Song | |

FOREIGN PATENT DOCUMENTS

CN    107709930 A    2/2018

OTHER PUBLICATIONS

Gaussian Mixture Models for Probabilistic Localization.

* cited by examiner

*Primary Examiner* — Matthew Franklin Gordon
(74) *Attorney, Agent, or Firm* — David R. Stevens; Stevens Law Group

(57) ABSTRACT

Systems, methods, and devices for determining a location of a vehicle or other device are disclosed. A method includes receiving sensor data from a sensor and determining a prior map comprising LIDAR intensity values. The method includes extracting a sub-region of the prior map around a hypothesis position of the sensor. The method includes extracting a Gaussian Mixture Model (GMM) distribution of intensity values for a region of the sensor data by expectation-maximization and calculating a log-likelihood for the sub-region of the prior map based on the GMM distribution of intensity values for the sensor data.

20 Claims, 11 Drawing Sheets

LOCALIZATION FOR AUTONOMOUS VEHICLES USING GAUSSIAN MIXTURE MODELS

TECHNICAL FIELD

The present disclosure relates to methods, systems, and apparatuses for localization and more particularly relates to methods, systems, and apparatuses for localization of a vehicle based on LIDAR sensor data.

BACKGROUND

Localization is a requirement for certain autonomous systems, including autonomous driving systems or mobile robotics systems. Localization is a key component for carrying out certain tasks such as obstacle avoidance, route planning, and mapping. An autonomous vehicle utilizes maps to know where objects are in the world around the vehicle. The autonomous vehicle can only make use of that information when the vehicle knows its own location within the map. Thus, a vehicle must perform localization to know its location, and in some implementations, must know its location with accuracy on the order of 10 centimeters.

Localization systems can be integrated in automobiles such as autonomous vehicles and driving assistance systems. Such systems are currently being developed and deployed to provide safety features, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive, navigate, and/or park a vehicle with little or no user input. However, due to the dangers involved in driving and the costs of vehicles, it is extremely important that autonomous vehicles and driving assistance systems operate safely and are able to accurately navigate roads in a variety of different driving environments.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
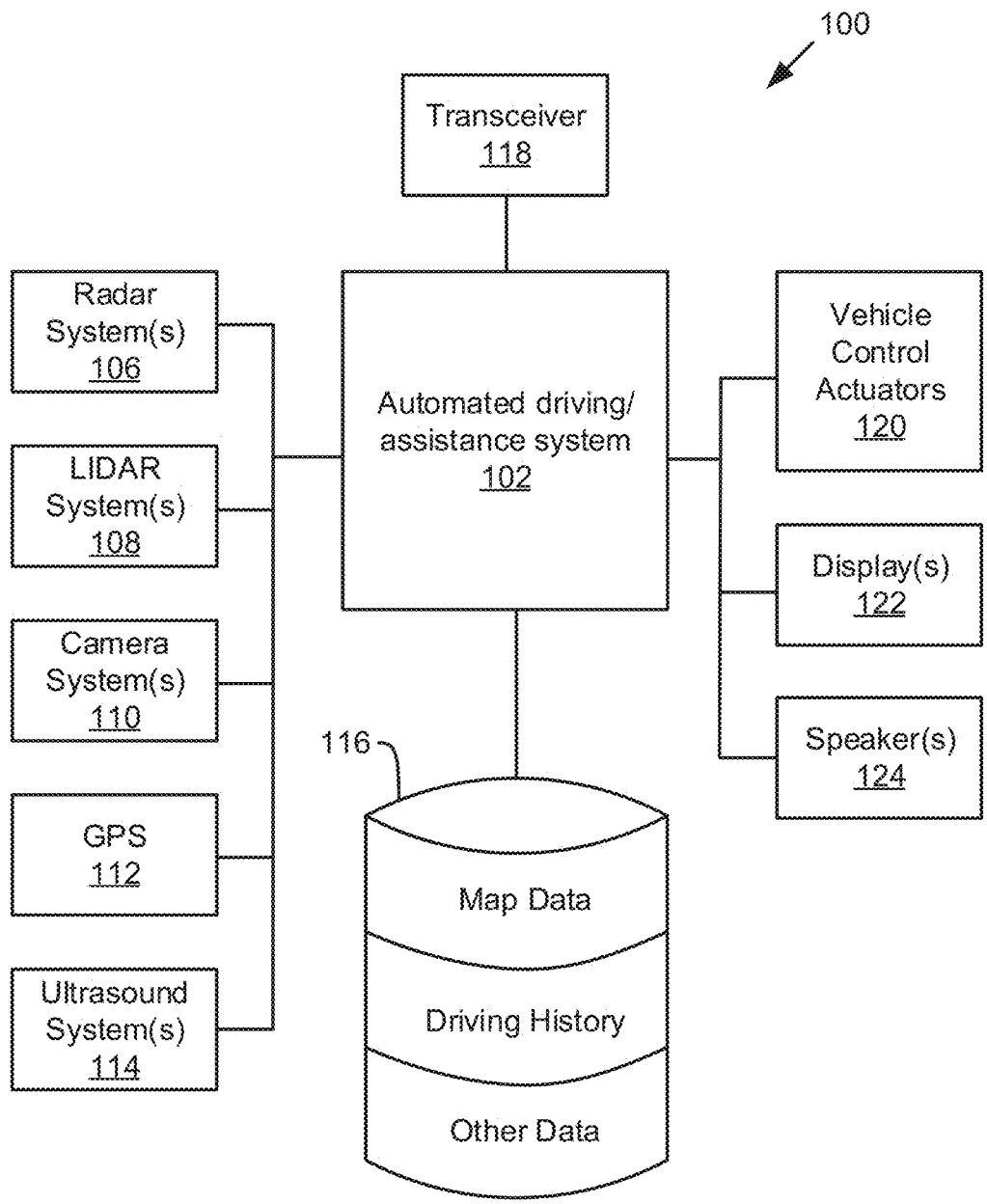
FIG. 1 is a schematic block diagram illustrating an example vehicle control system or autonomous vehicle system, according to one embodiment.

Localization of a vehicle within its environment is an important aspect of allowing for and improving operation of autonomous vehicle or driver assistance features. For example, a vehicle must know precisely where it is located within a nap to navigate safely around objects and determine a vehicle route. However, localization systems known in the art provide insufficient accuracy or are highly computationally intensive and require significant computing resources.

An autonomous vehicle utilizes maps to know where objects are in the world around the vehicle. The autonomous vehicle can only make use of that information when the vehicle knows its own location within the map. Thus, a vehicle must perform localization to know its location, and in some implementations, must know its location with accuracy on the order of 10 centimeters. In a critical safety situation, localization received from a global positioning system (GPS) does not provide sufficient accuracy. Additionally, many localization techniques known in the art are computationally very intensive and can limit the range of the vehicle if the vehicle has insufficient computing resources.

Applicant recognizes that an autonomous vehicle's range is dependent on the computation power the vehicle uses, and Applicant further recognizes that less computationally-intensive methods for vehicle localization may be beneficial. Applicant additionally recognizes that an autonomous vehicle may be in a situation where the vehicle must rapidly localize itself with a very poor initial guess, for example a GPS outage, and the vehicle's initial estimate of location must occur quickly and efficiently.

Applicant has developed systems, methods, and devices for vehicle localization using LIDAR sensor data received from a LIDAR sensor of a vehicle. The disclosure pertains to such systems, method, and devices capable of providing localization suitable for performing tasks such as obstacle avoidance, path planning, and mapping. It should be appreciated that localization is traditionally performed by GPS that may provide insufficient accuracy on the vehicle's location, or by computationally-intensive approaches that require significant computing resources and may not provide a location quickly enough in certain situations.

Several localization techniques known in the art approach map-based localization as a machine learning problem. Such techniques extract training metrics from a large amount of data and, during the localization process, inference is performed against the training metrics to obtain vehicle poses as outputs. The efficacy of such techniques depends on several key factors, including they accuracy of the localized pose estimated, the computational speed of the algorithm in automotive hardware, and the quality of data used in training and inference. Map-based approaches commonly use pre-computed prior maps as training data along with sensor data during the localization process for inference. Such techniques require significant computing resources and may not provide a sufficiently speedy result in certain situations.

Before the methods, systems, and devices for vehicle localization are disclosed and described, it is to be understood that this disclosure is not limited to the configurations, process steps, and materials disclosed herein as such configurations, process steps, and materials may vary somewhat. It is also to be understood that the terminology employed herein is used for describing implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

In one embodiment, a method for localization of a vehicle or other object is disclosed. The method includes receiving sensor data and retrieving a prior map comprising LIDAR intensity values. The method includes extracting a sub-region of the prior map around a hypothesis position of the sensor. The method includes extracting a Gaussian Mixture Model (GMM) distribution of intensity values for the sensor data by expectation-maximization. The method includes calculating a log-likelihood for the sub-region of the prior map based on the GMM distribution of intensity values for the sensor data.

An embodiment of the disclosure utilizes LIDAR point cloud data obtained during localization as training data to extract the GMM distribution of intensity values. Applicant notes that existing technologies known in the art may use prior map as training data from which quantities such as mean and covariance values for mixture components are computed and stored. An embodiment of the disclosure performs classification in real-time utilizing current sensor data and generates the GMM distribution of intensity values (may be referred to as training parameters) in real-time during localization. The systems, methods, and devices as disclosed mitigate storage constraints arising from storing multiple mixture maps in a prior map, as compared with existing mixture model-based approaches. The systems, methods, and devices of the disclosure are directed to computing a GMM distribution of intensity values in real-time with little overhead. In an embodiment of the disclosure, a majority of the computation time is spent searching and classifying sub-regions of a prior map.

An embodiment of the disclosure is directed to fast multiresolution LIDAR scanning for vehicle localization that may be particularly efficient in an urban environment. The systems, methods, and devices disclosed herein may provide vehicle localization within centimeter-level accuracy. The disclosure is directed to the use of Gaussian mixture maps to exploit structure in an environment of a vehicle, and in an embodiment the maps may be a collection of Gaussian mixtures over a height distribution. In an embodiment, localization of the vehicle occurs in real-time through multiresolution approaches that make use of rasterized prior map lookup tables of Gaussian mixtures. The systems, methods, and devices as disclosed herein may be effective for vehicle localization even under adverse weather conditions where methods known in the prior art will commonly fail or provide insufficient accuracy.

An embodiment of the disclosure is directed to map-based visual localization of a vehicle and may be particularly directed to map-based visual localization in an urban environment. The embodiment utilizes LIDAR sensor data comprising dense point clouds with measure of surface reflectivity. The embodiment may utilize prior map data received from a three-dimensional LIDAR scanner and determine the location of the vehicle by comparing the prior map data against current map data received from a three-dimensional LIDAR scanner that is configured to survey the vehicle's environment. The embodiment maximizes the normalized mutual information between the current LIDAR sensor data and the prior map sensor data.

Further embodiments and examples will be discussed in relation to the figures below.

Referring now to the figures, FIG. 1 illustrates an example vehicle control system 100 that may be used for autonomous or assisted driving. The automated driving/assistance system 102 may be used to automate or control operation of a vehicle or to aid a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 may use a neural network, or other model or algorithm to detect or localize objects based on perception data gathered by one or more sensors.

The vehicle control system 100 also includes one or more sensor systems/devices for detecting a presence of objects near or within a sensor range of a parent vehicle (e.g., a vehicle that includes the vehicle control system 100). For example, the vehicle control system 100 may include one or more radar systems 106, one or more LIDAR systems 108, one or more camera systems 110, a global positioning system (GPS) 112, and/or one or more ultrasound systems 114. The vehicle control system 100 may include a data store 116 for storing relevant or useful data for navigation and safety such as map data, driving history or other data. The vehicle control system 100 may also include a transceiver 918 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator which may be seen by a driver or passenger of a vehicle. A heads-up display may be used to provide notifications or indicate locations of detected objects or overlay instructions or driving maneuvers for assisting a driver. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-918. The sensor systems/devices 106-110 and 114 may be used to obtain real-time sensor data so that the automated driving/assistance system 102 can assist a driver or drive a vehicle in real-time.

Figure 2:
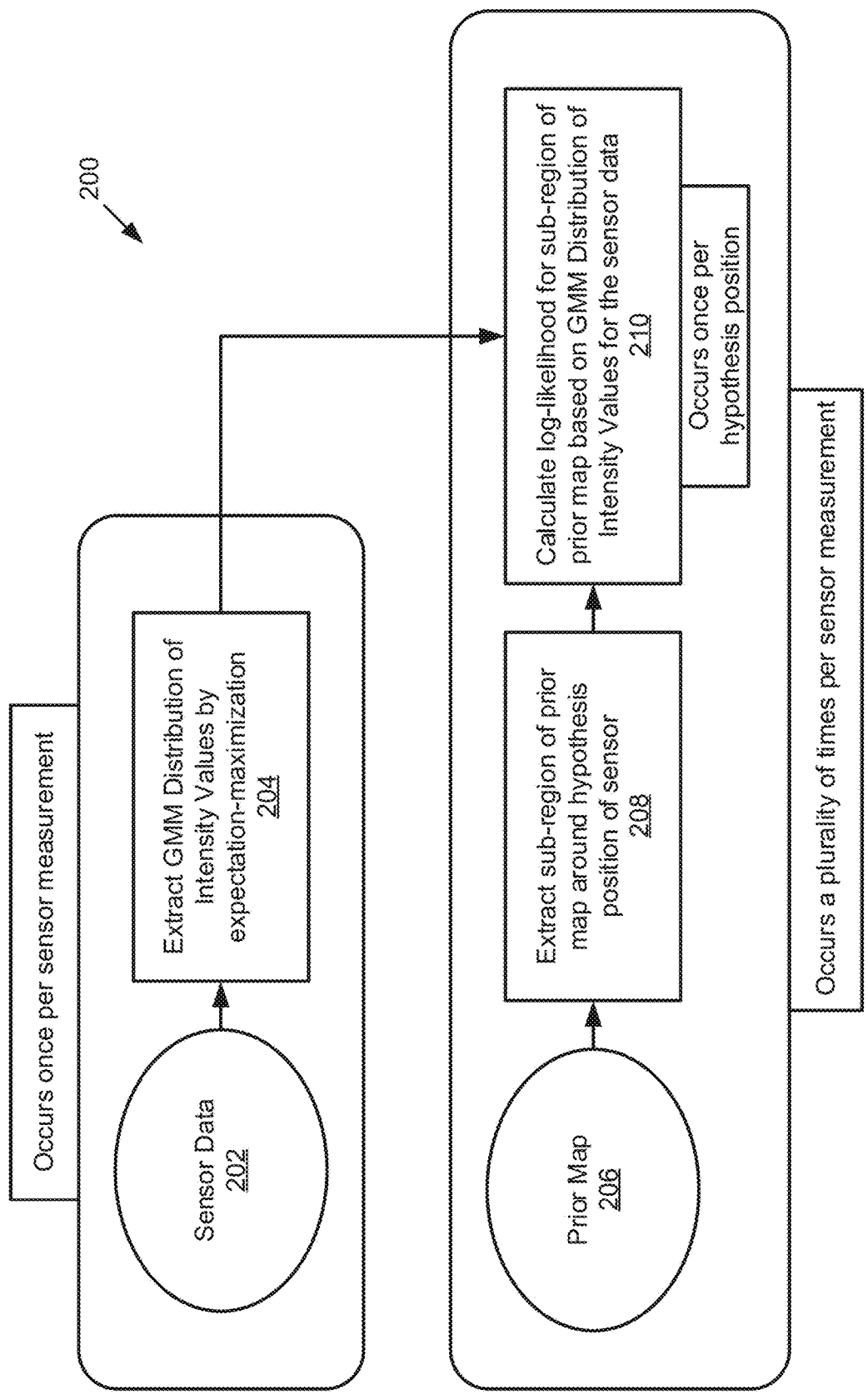
FIG. 2 is a schematic block diagram illustrating a process for determining a location of a vehicle or other object in an environment, according to one embodiment.

Referring now to FIG. 2, a process flow 200 for determining a location of a vehicle or other device is illustrated. In an embodiment the process flow 200 is carried out by automated driving/assistance system 102. The process flow 200 includes extracting at 204 Gaussian Mixture Model (GMM) distribution of intensity values by expectation maximization based on sensor data 202. The sensor data 202 may include LIDAR sensor data received from a LIDAR sensor of a vehicle. The extraction at 204 occurs once for each measurement by the sensor. The process flow 200 includes extracting at 208 a sub-region of a prior map 206 around a hypothesis position of the sensor. The process flow 200 includes calculating at 210 a log-likelihood for the sub-region of the prior map 206 based on the GMM distribution of intensity values that was extracted at 204 for the sensor data 202. The calculation at 210 occurs one for each sub-region of the prior map 206. A plurality of sub-regions is extracted from a prior map 206 for each measurement by the sensor.

Figure 3:
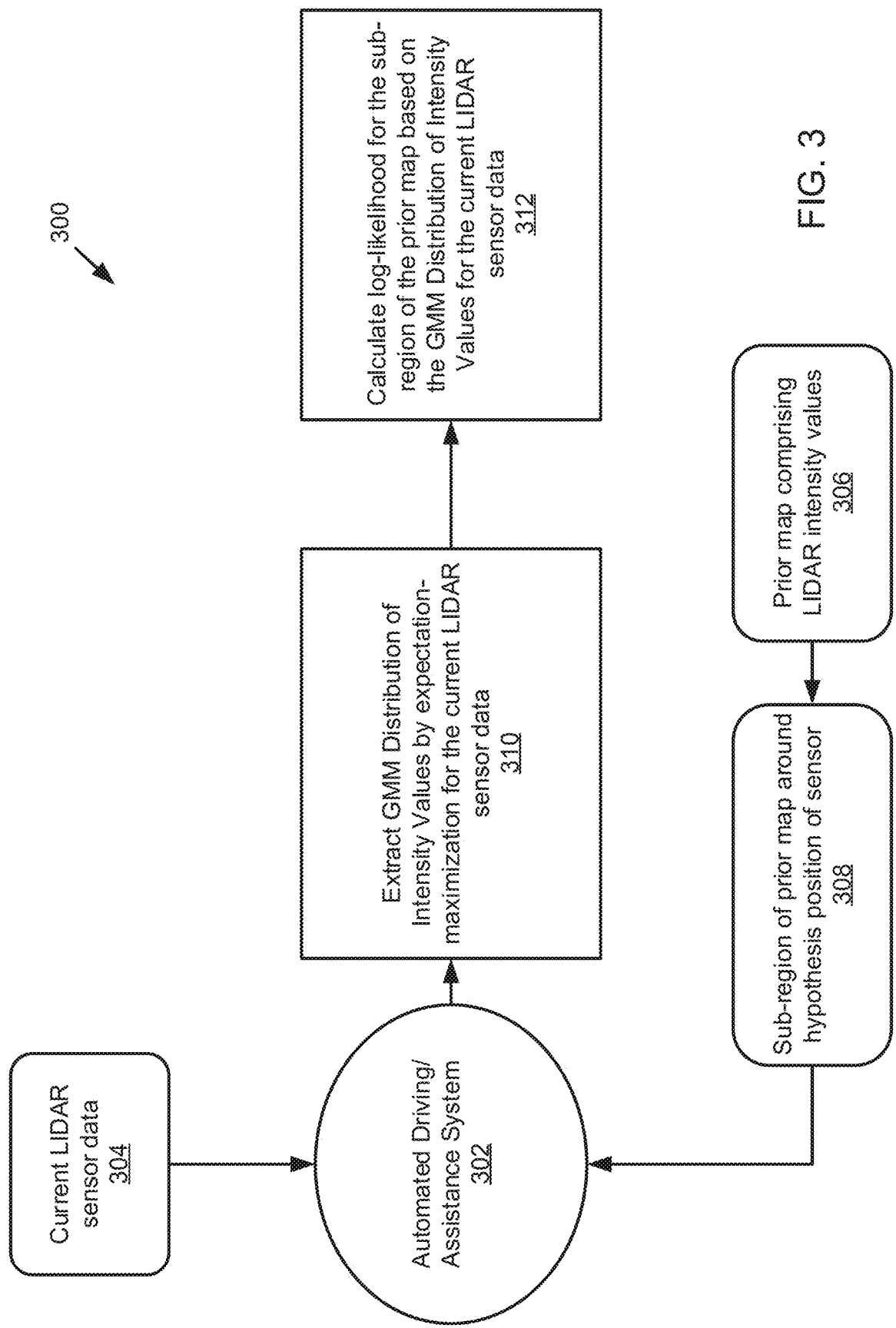
FIG. 3 is a schematic block diagram illustrating a process for determining a location of a vehicle or other object in an environment, according to one embodiment.

Referring now to FIG. 3, a process flow 300 for determining a location of a vehicle or other device is illustrated. In an embodiment the process flow 300 is carried out by automated driving/assistance system 302 like that disclosed in FIG. 1 (see 102). The process flow 300 includes the automated driving/assistance system 302 receiving current LIDAR sensor data 304 from a sensor of a vehicle, such as a LIDAR sensor. The automated driving/assistance system 302 determines a prior map comprising LIDAR intensity values 306 and a sub-region of the prior map around a hypothesis position of the sensor 308. In an embodiment, the automated driving/assistance system 302 retrieves the prior map from memory, downloads the prior map from a network-based storage, and/or receives the prior map. The automated driving/assistance system 302 extracts at 310 a GMM distribution of intensity values by expectation-maximization for the current LIDAR sensor data 304. The automated driving/assistance system calculates at 312 a log-likelihood for the sub-region of the prior map 308 based on the GMM distribution of intensity values for the current LIDAR sensor data 304.

The current LIDAR sensor data 304 includes data received from a LIDAR sensor and may particularly include data received from a LIDAR sensor attached to or associated with a vehicle. The current LIDAR sensor data 304 may include two-dimensional raster maps of LIDAR intensity values. The current LIDAR sensor data 304 may be particularly directed to a surrounding environment of a vehicle and may be utilized to determine a location of the vehicle to a high degree of accuracy, as disclosed herein.

The GMM distribution of intensity values are determined during a training phase of the process flow 300. In an embodiment, the training phase occurs in real-time during localization of the vehicle. The GMM distribution of intensity values are determined by expectation-maximization on the current LIDAR sensor data 304. The current LIDAR sensor data 304 is parameterized as a mixture of two Gaussians, and in further embodiments additional mixture components may be used if deemed necessary for the application. The LIDAR point cloud of the current LIDAR sensor data 304 may be modeled according to Equation 1, below. In Equation 1, the variable I refers to a data point in the point cloud of the current LIDAR sensor data 304 that is obtained during measurement. In one embodiment, the two Gaussian mixture fit is computed utilizing expectation-maximization procedure to return six parameters, including $w_1, w_2, \mu_1, \mu_2, \sigma_1, \sigma_2$, that constitute the GMM distribution of intensity values. The variable w of the GMM distribution of intensity values can denote the weight of the distribution of LIDAR intensity values of the current LIDAR sensor data 304. The variable $\mu$ (mu) of the GMM distribution of intensity values can denote the mean of the distribution of LIDAR intensity values of the current LIDAR sensor data 304. The variable $\sigma$ (sigma) of the GMM distribution of intensity values can denote the standard deviation of the distribution of LIDAR intensity values of the current LIDAR sensor data 304. The six parameters (i.e. GMM distribution of intensity values), including the weight, mean, and standard deviation of the distribution of LIDAR intensity values of the current LIDAR sensor data 304 can be used to calculate at 312 a log-likelihood for a sub-region of a prior map 308. In an embodiment, sub-region of the prior map 308 may correspond with a region of the current LIDAR sensor data 304, and the GMM distribution of intensity values pertaining to the current LIDAR sensor data 304 may be utilized to estimate a location of the sensor that produces the current LIDAR sensor data 304 (and further estimate a location of the vehicle).

$$p(I|\mu_1,\sigma_1,\mu_2\sigma_2|)=w_1N(I|\mu_1,\sigma_1|)+w_2N(I|\mu_1,\sigma_2|) \quad \text{Equation 1}$$

In an embodiment, the prior map 306 is determined in real-time during localization of the vehicle. In such an embodiment, the GMM distribution of intensity values is further determined in real-time during localization of the vehicle during a training phase. Such an embodiment may greatly mitigate storage constraints arising from storing multiple mixture maps in a prior map. The GMM distribution of intensity values may be computed in real-time with little overhead. In such an embodiment, the majority of computation time is spent searching and classifying the sub-regions of the prior map.

In an embodiment, the prior map 306 is captured by a LIDAR sensor at a location, and the location is determined by a global positioning system. In such an embodiment, the automated driving/assistance system 302 may utilize a current GPS reading to retrieve the prior map 306 associated with the same or a nearby GPS reading. In such an embodiment, the automated driving/assistance system 302 may quickly return an accurate location of the vehicle without consuming significant computing resources. In an alternative embodiment, for example where a GPS is not functioning, the automated driving/assistance system 302 may retrieve a prior map 306 having GPS metadata that is near an estimated location of the vehicle. Additionally, the prior map 306 may be captured by a LIDAR sensor of the current vehicle or it may be captured by any other LIDAR sensors associated with other vehicles or other devices. Such prior maps 306 may be stored in local memory of a vehicle, may be stored in a cloud-based database, may be stored in a blockchain database, and so forth. In an embodiment, a plurality of vehicles is in communication with a network, and the plurality of vehicles provide a plurality of prior maps 306 that may be utilized by any one of the plurality of vehicles.

In an embodiment, the process of extracting at 310 the GMM distribution of intensity values by expectation-maximization includes utilizing an iterative algorithm that starts from initial estimate and proceeds to iteratively update the initial estimate until convergence is detected. Each iteration consists of an E-step and an M-step. The E-step denotes the current parameter values and computes a membership weight for all data points and all mixture components. The M-step utilizes the membership weights for the data points to calculate new parameter values, wherein the sum of the membership weights for a component is the effective number of data points assigned to the component. The M-step is complete after all parameters have been computed, and following completion of the M-step, the weights computed in the E-step may be recomputed and the parameters may be updated. A process pair including the E-step and the M-step is considered one iteration of the algorithm.

The process of extracting at 310 the GMM distribution of intensity values by expectation-maximization for the current LIDAR sensor data 304 includes calculating the parameters including $w_1, w_2, \mu_1, \mu_2, \sigma_1, \sigma_2$. In an embodiment, the extraction at 310 utilizes two Gaussians to provide a good representation for what the road intensity data looks like, for example, paint and road surface on a road surrounding a vehicle. The current LIDAR sensor data 304 obtained in real-time is trained to produce statistical quantities that may be utilized for localization of the vehicle.

The calculation at 312 returns log-likelihood values i.e. the log-likelihood for each sub-region of a plurality of sub-regions of the prior map 306. The log-likelihood values can be utilized to update a position filter, to update particle weights in a particle filter, to utilize the maximum log-likelihood value to set as the current estimate of the location of the vehicle, and/or to take the distribution around the highest peak as a mean/covariance for a Kalman filter.

A Kalman filter is also known as a linear quadratic estimation and is an algorithm that utilizes a series of measurements observed over time containing statistical noise and other inaccuracies and produces estimates of unknown variables that tend to be more accurate than those based on a single measurement alone, by estimating a joint probability distribution over the variables for each timeframe. The Kalman filter works in a two-step process. In the prediction step, the Kalman filter produces estimates of the current state variables, along with their uncertainties. Once the outcome of the next measurement (necessarily corrupted with some amount of error, including random noise), is observed, these estimates are updated using a weighted average, with more weight being given to estimates with higher certainty. The Kalman filter algorithm is recursive. The Kalman filter algorithm can run in real-time utilizing only the present input measurements and the previously calculated state and its uncertainty matrix.

In an embodiment, the log-likelihood is calculated at 312 according to Equation 2, below. Equation 2 computes the log-likelihood for a sub-region (of a plurality of sub-regions) of the prior map 306. The variable k indicates a running index denoting the points within the sub-region of the prior map 308. The parameters $w_1, w_2, \mu_1, \mu_2, \sigma_1, \sigma_2$ are learned quantities from the GMM distribution of intensity values. The log-likelihoods for the plurality of sub-regions of the prior map are ranked such that higher log-likelihood values are more likely to indicate the location of the vehicle and/or the sensor capturing the current LIDAR sensor data 304.

$$LL = \Sigma_k \log[w_1 N(I_k | \mu_1, \sigma_1) + w_2 N(I_k | \mu_2, \sigma_2)] \quad \text{Equation 2}$$

The process flow 300 can be particularly effective for determining a two-dimensional x,y position of a vehicle or other device. It should be appreciated that the process flow 300 can be easily extended to the rotational heading estimate as well.

The process of extracting a region from the current LIDAR sensor data (see 304) at 312 includes selecting a region of a plurality of regions contained in the current LIDAR sensor data 304. In an embodiment, the region is extracted (or selected) utilizing a grid sampling method and may alternatively be extracted utilizing a particle filter.

Figure 4:
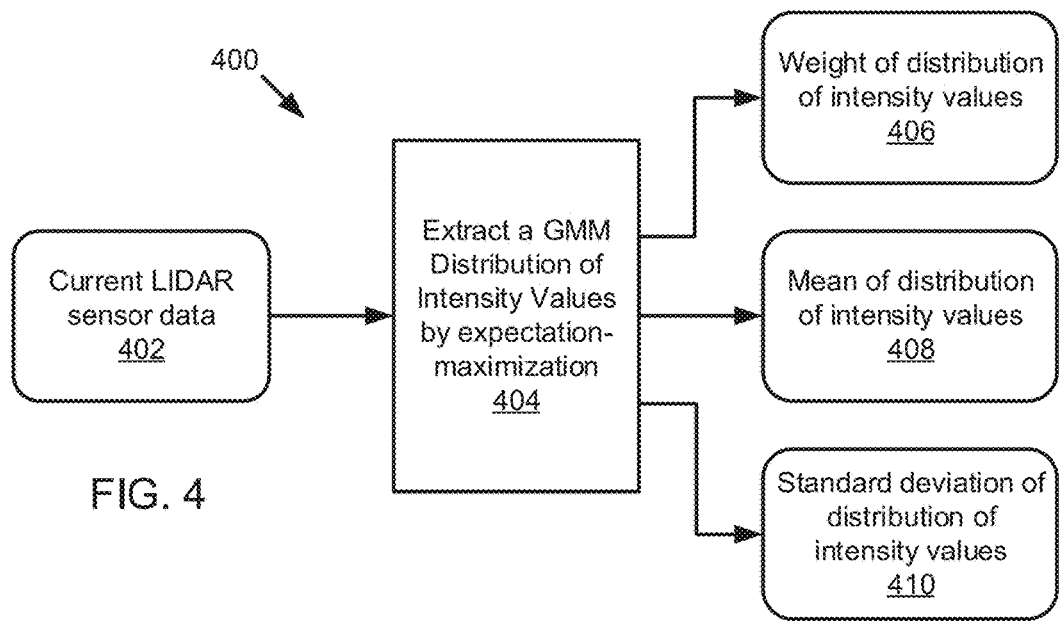
FIG. 4 is a schematic block diagram illustrating a process for determining a set of parameters based on current sensor data, according to one embodiment.

FIG. 4 illustrates a process flow 400 for generating a GMM distribution of intensity values based on current LIDAR sensor data 402. The process flow 400 includes receiving current LIDAR sensor data 402. The process flow 400 includes extracting at 404 a GMM distribution of intensity values by expectation-maximization based on the current LIDAR sensor data 402. The process flow 400 includes outputting each of: a weight of distribution of intensity values 406, a mean of distribution of intensity values 408, and a standard deviation of distribution of intensity values 410. In an embodiment, the output includes two each of the weight 406, the mean 408, and the standard deviation 410.

Figure 5:
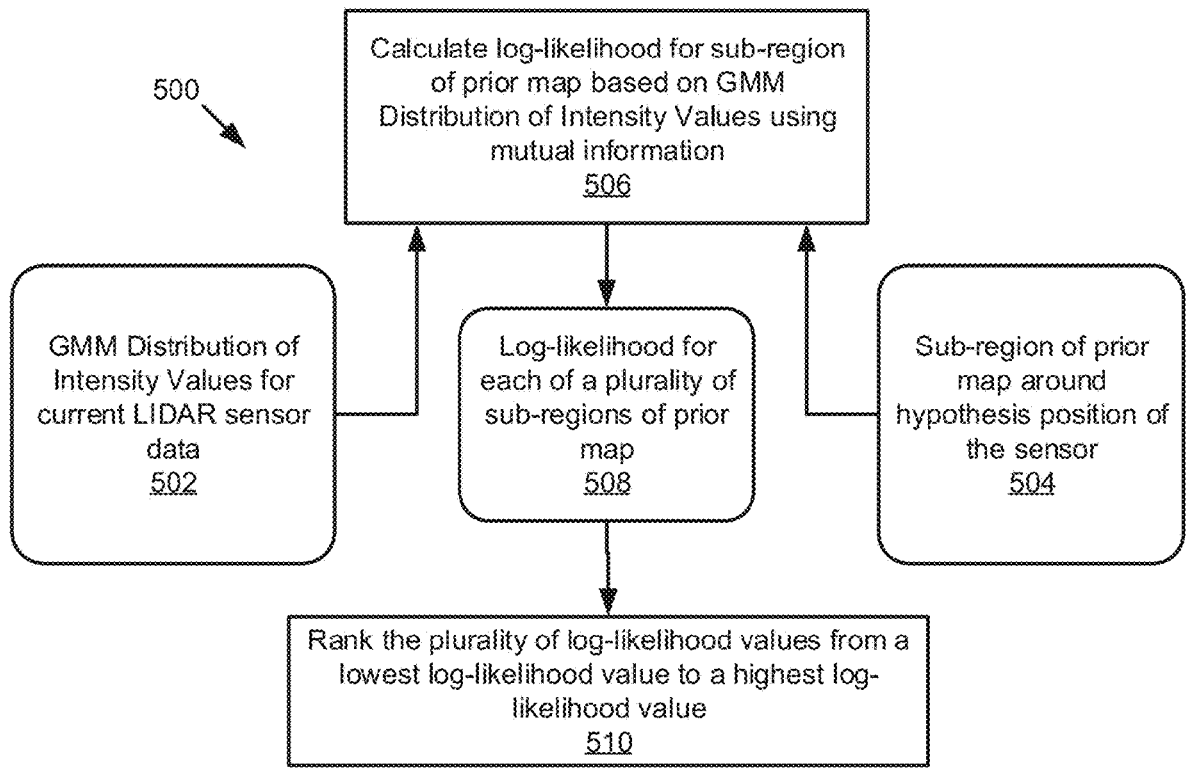
FIG. 5 is a schematic block diagram illustrating a process for determining a log-likelihood value for a sub-region of a prior map, according to one embodiment.

FIG. 5 illustrates a process flow 500 for determining a location of a vehicle or other device. The process flow 500 includes determining at 502 a GMM distribution of intensity values by expectation-maximization based on current LIDAR sensor data. The process flow 500 includes extracting at 504 a sub-region of a prior map around a hypothesis position of a sensor or vehicle. The process flow 500 includes calculating at 506 a log-likelihood for the sub-region of the prior map based on the GMM distribution of intensity values using mutual information. The process flow 500 includes calculating at 508 a log-likelihood for each sub-region of a plurality of sub-regions of the prior map. The process flow 500 includes ranking at 510 the plurality of log-likelihoods values that were calculated for each sub-region of the plurality of sub-regions of the prior map. The ranking at 510 includes ranking from a lowest log-likelihood value to a highest log-likelihood value, wherein a higher log-likelihood value indicates a higher probability that the sub-region comprises the position of the sensor or vehicle.

Figure 6:
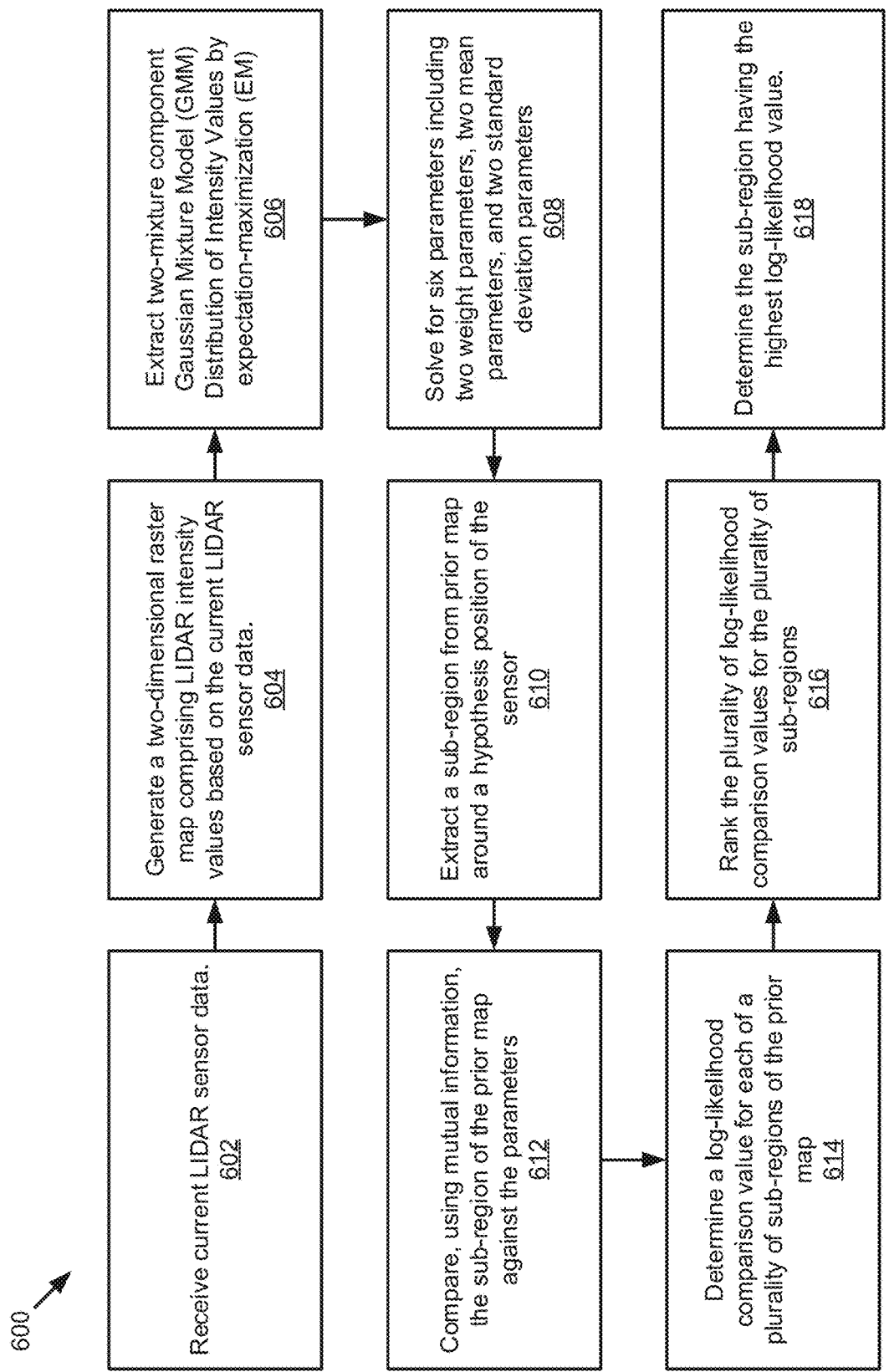
FIG. 6 is a schematic block diagram illustrating a process for determining a location of a vehicle or other object in an environment, according to one embodiment.

FIG. 6 illustrates a process flow 600 for estimating a location of a vehicle or other device. The process flow 600 begins and a computing resource, such as an automated driving/assistance system 102, receives current LIDAR sensor data at 602. The computing resource generates a two-dimensional raster map comprising LIDAR intensity values based on the current LIDAR sensor data at 604. The computing resource extracts a two-mixture component Gaussian Mixture Model (GMM) distribution of intensity values by expectation-maximization based on the current LIDAR sensor data at 606. The computing resource solves for six parameters including two weight parameters, two mean parameters, and two standard deviation parameters, for the GMM distribution of intensity values of the current LIDAR sensor data at 608. The computing resource extracts one or more sub-regions from a prior map around one or more hypothesis locations of the sensor at 610. The computing resource compares, using mutual information, a sub-region of the prior map against the parameters (based on the GMM distribution of intensity values calculated for the current LIDAR sensor data) at 612. The computing resource determines a log-likelihood comparison value for each sub-region of the plurality of sub-regions of the prior map at 614. The computing resource ranks the plurality of log-likelihood comparison values for each of the plurality of sub-regions of the prior map, from a lowest log-likelihood value to a highest log-likelihood value at 616. The computing resource determines the sub-region of the prior map having the highest log-likelihood value at 618. The sub-region having the highest log-likelihood value is estimated to indicate the location of the sensor.

Figure 7:
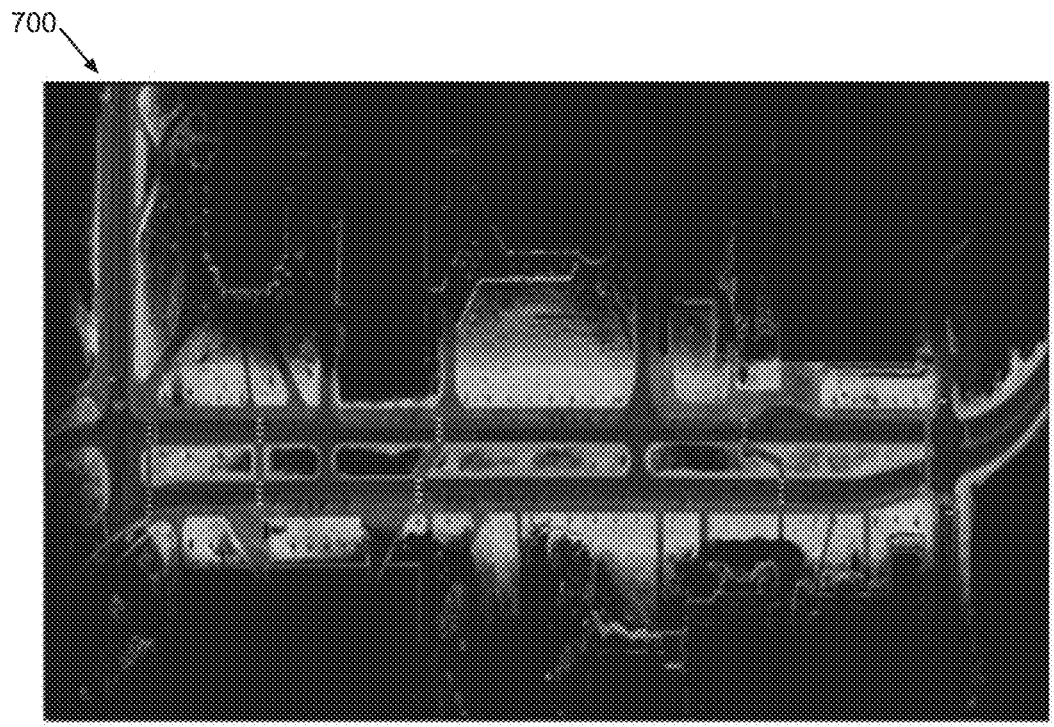
FIG. 7 is an example LIDAR intensity map, according to one embodiment.

FIG. 7 illustrates an example of a LIDAR intensity map 700. The LIDAR intensity map 700 illustrates an intensity measurement for each point on the map as the return strength of the laser pulse that generated the point. The return strength is based in part on the reflectivity of the object struck by the laser pulse. The reflectivity is a function of the wavelength utilized which is commonly near infrared wavelength. The strength of the return varies with the composition of the surface object reflecting the return. The LIDAR intensity map 700 is utilized as an aid in feature detection and extraction and LIDAR point classification. In an embodiment the intensity is relative and not quantifiable.

Figure 8:
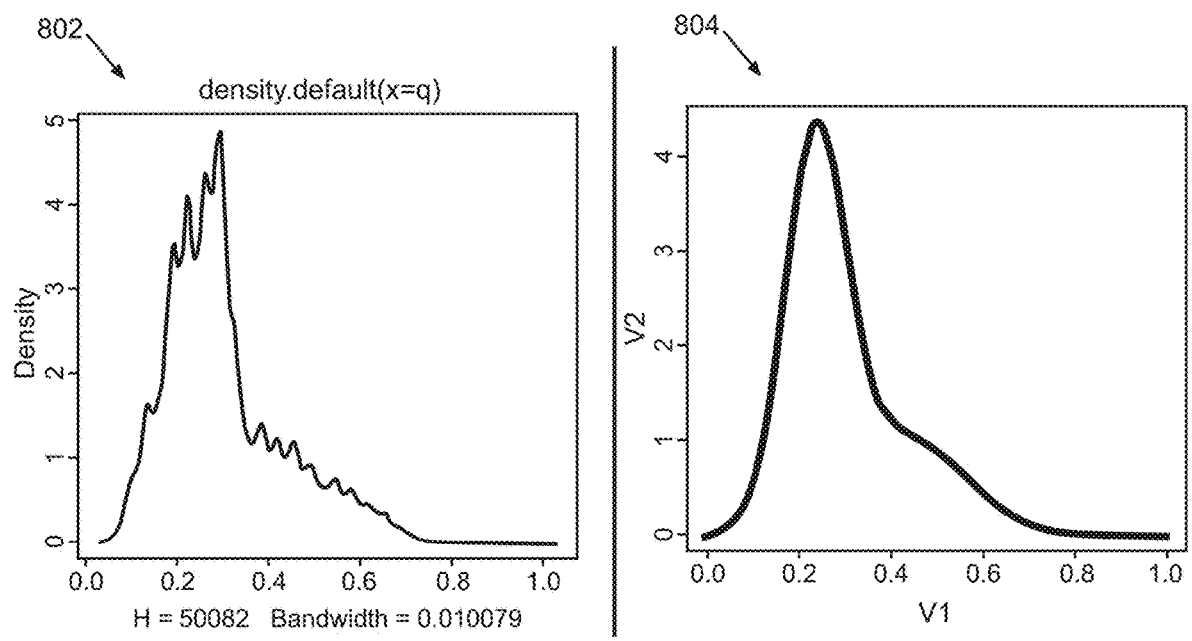
FIG. 8 is an example LIDAR intensity graph and Gaussian Mixture Model graph, according to one embodiment.

FIG. 8 illustrates a distribution of LIDAR intensity graph 802 and a two-mixture component GMM graph 804. The distribution of LIDAR intensity graph 802 illustrates a distribution of LIDAR intensity values for a patch of a prior map. A similar map may be generated for a distribution of LIDAR intensity values for a region of current LIDAR sensor data. The two-mixture component GMM graph 804 illustrates a distribution of a two-component Gaussian Mixture Model based on the distribution of LIDAR intensity values in the LIDAR intensity graph 802.

Figure 9:
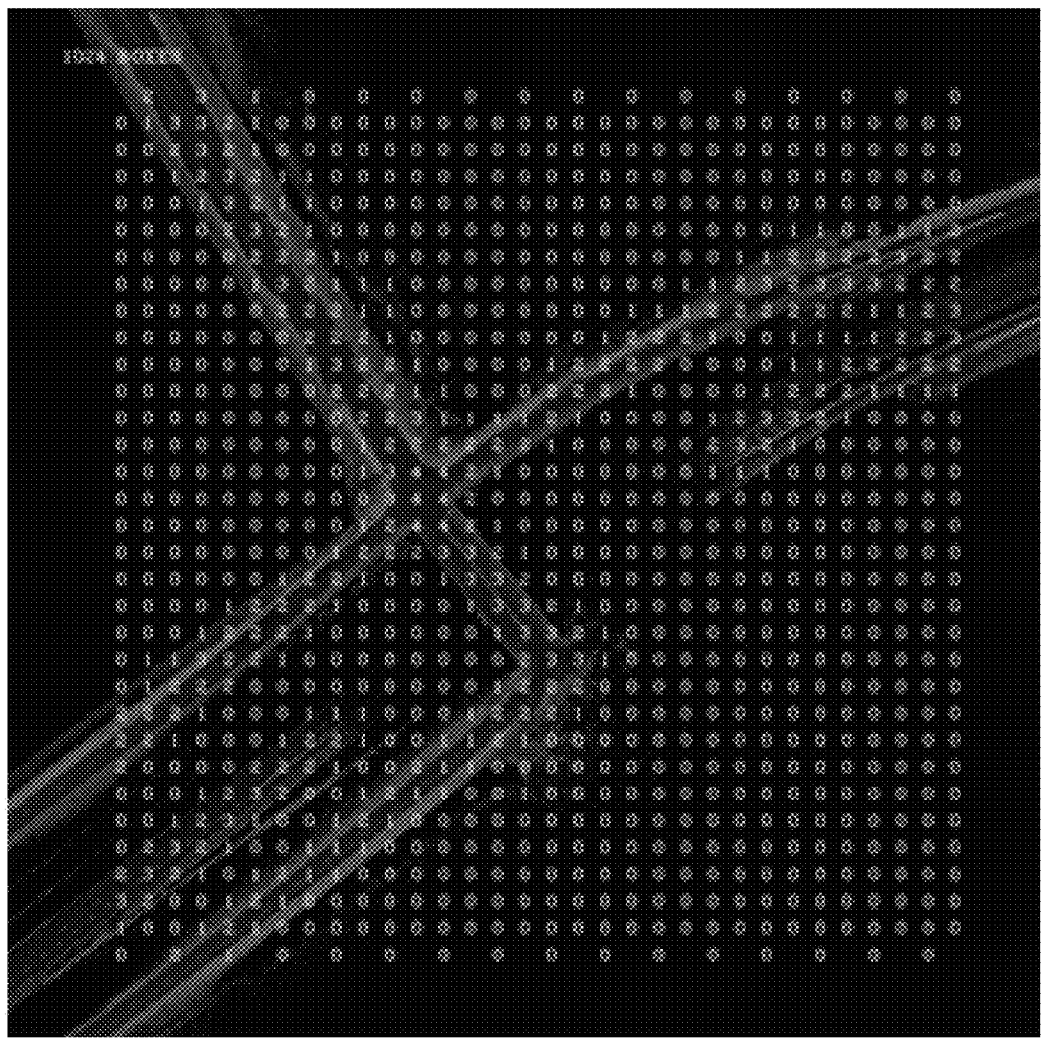
FIG. 9 is an example distribution of LIDAR intensity values map, according to one embodiment.

FIG. 9 illustrates a distribution of likelihood values map 900 that may include log-likelihoods in one embodiment. The distribution of likelihood values map 900 as illustrated is scaled down for clarity and overlaid on a section of a map. The highest likelihood values surround the intersection to the left of center and this illustrates the vehicle's true position.

Figure 10:
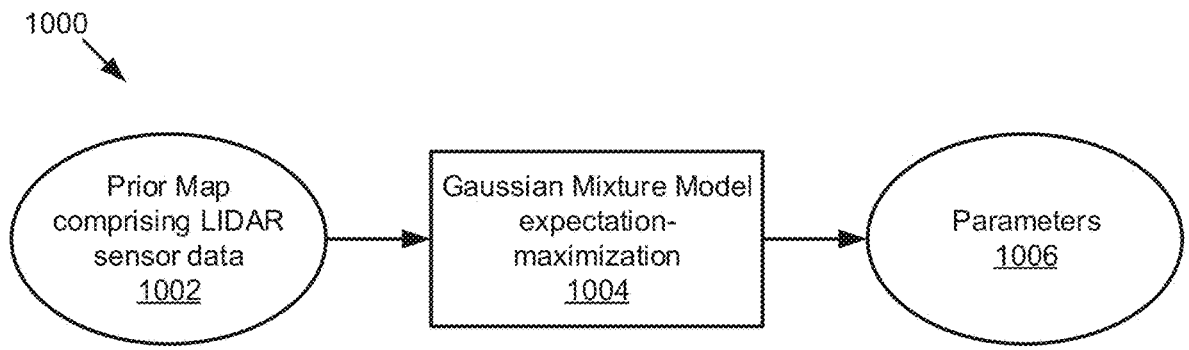
FIG. 10 is a schematic block diagram illustrating a process for determining parameters, according to one embodiment.

FIG. 10 illustrates a process flow 1000 for generating a GMM distribution of intensity values based on current LIDAR sensor data. The process flow 1000 includes receiving a prior map comprising LIDAR sensor data at 1002. The process flow 1000 includes extracting GMM distribution of intensity values by expectation-maximization for current LIDAR sensor data received from a LIDAR sensor at 1004. The process flow 1000 includes determining parameters at 1006 based on the GMM distribution of intensity values.

In an embodiment, the process flow 1000 for generating the parameters 1006 occurs in real-time during localization of a vehicle and the GMM distribution of intensity values is not retrieved from memory. Such an embodiment may greatly mitigate storage constraints arising from storing multiple mixture maps in the prior map. The parameters 1006 may be computed in real-time with little overhead, and much of the computation time may be spent searching and classifying sub-regions of a prior map.

Figure 11:
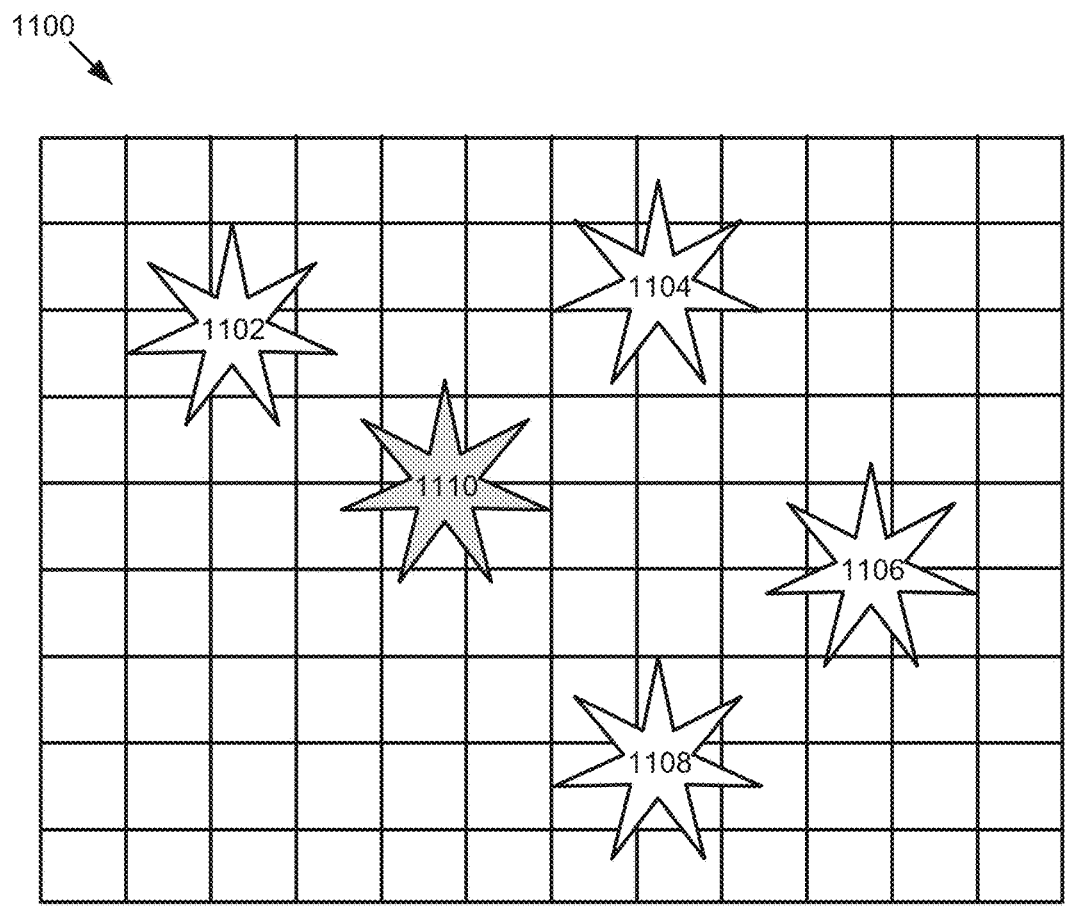
FIG. 11 is an example classification map including a plurality of sub-regions, according to one embodiment.

FIG. 11 illustrates a classification 100 of a prior map. The classification 1100 includes a plurality of sub-regions of the prior map 1102-1110. The plurality of sub-regions of the prior map 1102, 1104, 1106, 1108, 1110 may be ranked based on log-likelihood values, where a higher log-likelihood value indicates a higher likelihood that the sub-region 1102-1110 comprises the current location of the vehicle. In FIG. 11, sub-region 1110 is shaded to indicate it is ranked as having the highest log-likelihood value. Sub-region 1110 therefore indicates the region having the highest probability of comprising the true location of the vehicle.

Figure 12:
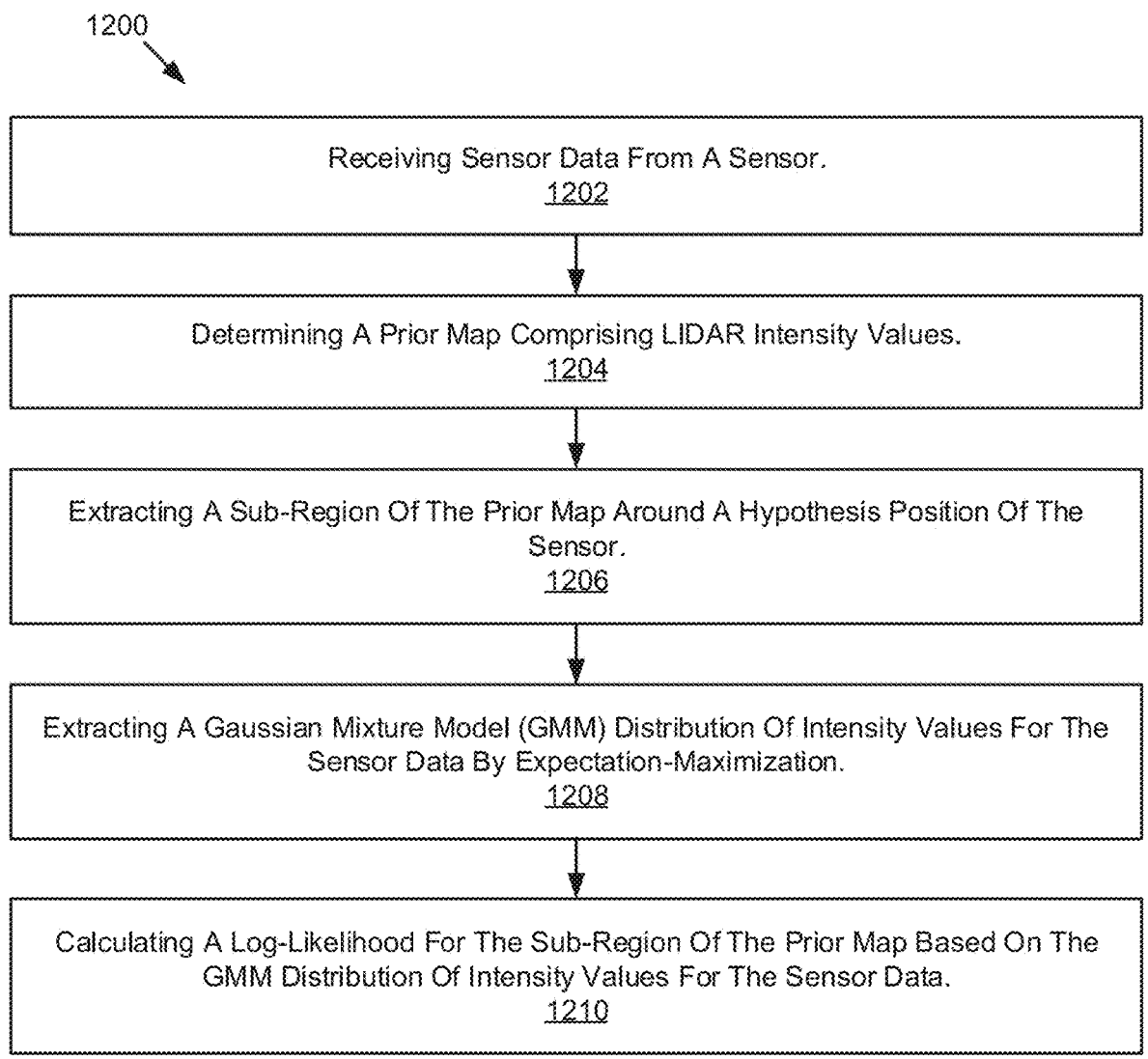
FIG. 12 is a schematic flow chart diagram of a method for determining a location of a vehicle or other object in an environment, according to one embodiment.

FIG. 12 illustrates a schematic flow-chart diagram of a method 1200 for determining a location of a vehicle or other device. The method 1200 may be carried out by any suitable computing device and is carried out by an automated driving/assistance system 102 in one embodiment. The method 1200 begins and the computing device receives at 1202 sensor data from a sensor such as a LIDAR sensor of a vehicle. The computing device determines at 1204 a prior map comprising LIDAR intensity values. The computing device extracts at 1206 a sub-region of the prior map around a hypothesis position of the sensor, wherein the hypothesis position of the sensor may be facilitated by, for example, location information received from a global positioning system. The computing device extracts at 1208 a Gaussian Mixture Model (GMM) distribution of intensity values for the sensor data by expectation maximization. The computing device calculates at 1210 a log-likelihood for the sub-region of the prior map based on the GMM distribution of intensity values for the sensor data.

Figure 13:
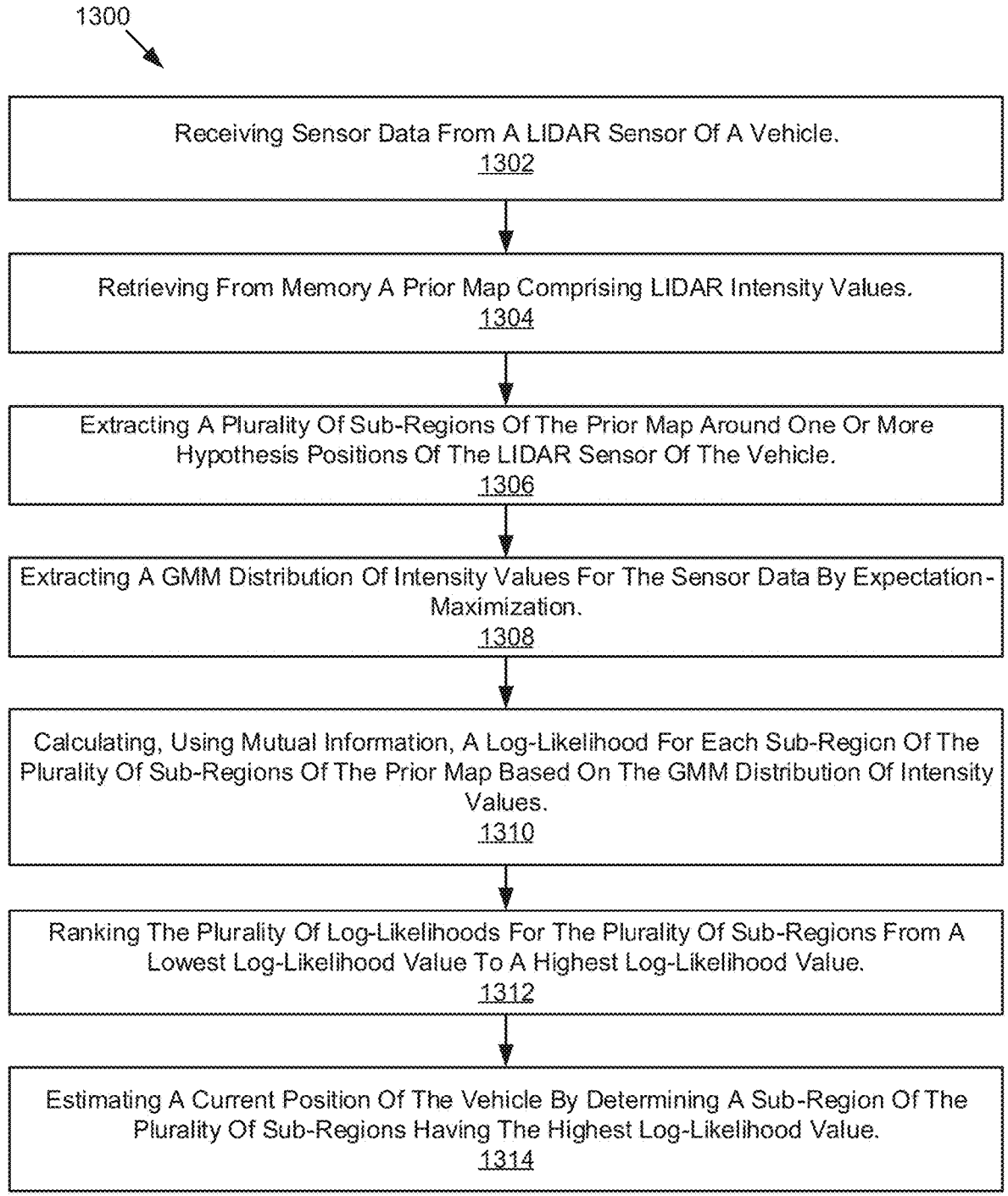
FIG. 13 is a schematic flow chart diagram of a method for determining a location of a vehicle or other object in an environment, according to one embodiment.

FIG. 13 illustrates a schematic flow-chart diagram of a method 1300 for determining a location of a vehicle or other device. The method 1300 may be carried out by any suitable computing device and is carried out by an automated driving/assistance system 102 in one embodiment. The method 1300 begins and a computing device receives at 1302 sensor data from a LIDAR sensor of a vehicle. The computing device retrieves at 1304 from memory a prior map comprising LIDAR intensity values. The computing device extracts at 1306 a plurality of sub-regions from the prior map around one or more hypothesis positions of the LIDAR sensor of the vehicle. The computing device extracts at 1308 a GMM distribution of intensity values for the sensor data by expectation-maximization. The computing device calculates at 1310, using mutual information, a log-likelihood for each sub-region of the plurality of sub-regions of the prior map based on the GMM distribution of intensity values. The computing device ranks at 1312 the plurality of log-likelihoods for the plurality of sub-regions of the prior map from a lowest log-likelihood value to a highest log-likelihood value. The computing device estimates at 1314 a current position of the vehicle by determining a sub-region of the plurality of sub-regions having the highest log-likelihood value.

Figure 14:
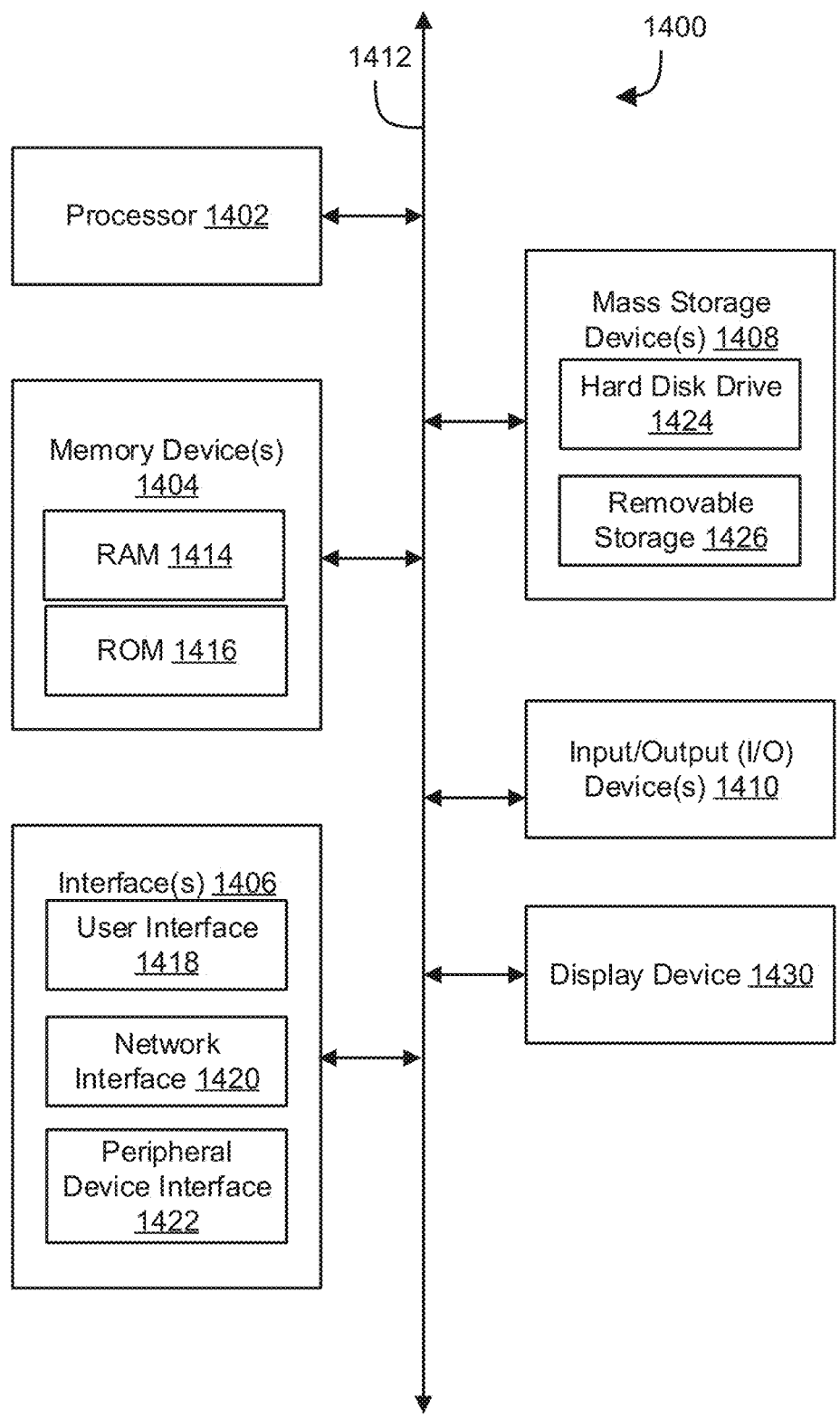
FIG. 14 is a schematic block diagram illustrating an example computing system, according to one embodiment.

Referring now to FIG. 14, a block diagram of an example computing device 1400 is illustrated. Computing device 1400 may be used to perform various procedures, such as those discussed herein. In one embodiment, the computing device 1400 can function as a vehicle controller, a server, and the like. Computing device 1400 can perform various monitoring functions as discussed herein, and can execute one or more application programs, such as the application programs or functionality described herein. Computing device 1400 can be any of a wide variety of computing devices, such as a desktop computer, in-dash computer, vehicle control system, a notebook computer, a server computer, a handheld computer, tablet computer and the like.

Computing device 1400 includes one or more processor(s) 1402, one or more memory device(s) 904, one or more interface(s) 1406, one or more mass storage device(s) 1408, one or more Input/output (I/O) device(s) 1410, and a display device 1430 all of which are coupled to a bus 1412. Processor(s) 1402 include one or more processors or controllers that execute instructions stored in memory device(s) 1404 and/or mass storage device(s) 1408. Processor(s) 1402 may also include various types of computer-readable media, such as cache memory.

Memory device(s) 1404 include various computer-readable media, such as volatile memory (e.g., random access memory (RAM) 1414) and/or nonvolatile memory (e.g., read-only memory (ROM) 1416). Memory device(s) 1404 may also include rewritable ROM, such as Flash memory.

Mass storage device(s) 1408 include various computer readable media, such as magnetic tapes, magnetic disks, optical disks, solid-state memory (e.g., Flash memory), and so forth. As shown in FIG. 1, a particular mass storage device is a hard disk drive 1424. Various drives may also be included in mass storage device(s) 1408 to enable reading from and/or writing to the various computer readable media. Mass storage device(s) 1408 include removable media 1426 and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, and the like.

Display device 1430 includes any type of device capable of displaying information to one or more users of computing device 1400. Examples of display device 1430 include a monitor, display terminal, video projection device, and the like.

Interface(s) 1406 include various interfaces that allow computing device 1400 to interact with other systems, devices, or computing environments. Example interface(s) 1406 may include any number of different network interfaces 1420, such as interfaces to local area networks (LANs), wide area networks (WANs), wireless networks, and the Internet. Other interface(s) include user interface 1418 and peripheral device interface 1422. The interface(s) 1406 may also include one or more user interface elements 1418. The interface(s) 1406 may also include one or more peripheral interfaces such as interfaces for printers, pointing devices (mice, track pad, or any suitable user interface now known to those of ordinary skill in the field, or later discovered), keyboards, and the like.

Bus 1412 allows processor(s) 1402, memory device(s) 1404, interface(s) 1406, mass storage device(s) 1408, and I/O device(s) 1410 to communicate with one another, as well as other devices or components coupled to bus 1412. Bus 1412 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1400 and are executed by processor(s) 1402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method for determining a location of a vehicle or other device. The method includes receiving sensor data from a sensor and determining a prior map comprising LIDAR intensity values. The method includes extracting a sub-region of the prior map around a hypothesis position of the sensor. The method includes extracting a Gaussian Mixture Model (GMM) distribution of intensity values for a region of the sensor data by expectation-maximization and calculating a log-likelihood for the sub-region of the prior map based on the GMM distribution of intensity values for the sensor data.

Example 2 is a method as in Example 1, further including calculating a log-likelihood for each sub-region of a plurality of sub-regions of the prior map to produce a plurality of log-likelihood values and ranking the plurality of log-likelihood values from a lowest log-likelihood value to a highest log-likelihood value. The method is such that a higher log-likelihood value indicates a higher probability that the corresponding sub-region of the prior map comprises a current position of the sensor.

Example 3 is a method as in any of Examples 1-2, further comprising estimating the current position of the sensor by determining the sub-region of the plurality of sub-regions having a highest log-likelihood value.

Example 4 is a method as in any of Examples 1-3, further comprising updating a particle weight in a particle filter based on one or more of the plurality of log-likelihood values calculated for the plurality of sub-regions of the prior map.

Example 5 is a method as in any of Examples 1-4, further comprising extracting a distribution around a highest peak for the sub-region having the highest log-likelihood value and utilizing the distribution around the highest peak as a mean for a Kalman filter.

Example 6 is a method as in any of Examples 1-5, wherein extracting the sub-region of the prior map around the hypothesis position of the sensor comprises one or more of: determining a grid overlay on the sensor data; or applying a particle filter to the sensor data; wherein the sub-region of the prior map is approximately the same size as the sensor data.

Example 7 is a method as in any of Examples 1-6, wherein the GMM distribution of intensity values for the region of the sensor data comprises one or more of: a weight of a distribution of current LIDAR intensity values of the sensor data; a mean of the distribution of the current LIDAR intensity values of the sensor data; or a standard deviation of the distribution of the current LIDAR intensity values of the sensor data.

Example 8 is a method as in any of Examples 1-7, wherein extracting the GMM distribution of intensity values for the region of the sensor data comprises parameterizing the region of the sensor data as a mixture of two Gaussians utilizing a two-mixture component to solve for the GMM distribution of intensity values, wherein the two-mixture component provides a representation of road intensity data within the sensor data.

Example 9 is a method as in any of Examples 1-8, wherein the GMM distribution of intensity values for the region of the sensor data comprises: two values for a weight of a distribution of current LIDAR intensity values of the sensor data; two values for a mean of the distribution of the current LIDAR intensity values of the sensor data; and two values for a standard deviation of the distribution of the current LIDAR intensity values of the sensor data.

Example 10 is a method as in any of Examples 1-9, wherein: the extracting the GMM distribution of intensity values occurs once for each measurement by the sensor; and the calculating the log-likelihood for the sub-region of the prior map occurs a plurality of times for each measurement by the sensor.

Example 11 is a method as in any of Examples 1-10, further comprising: determining a sub-region of the plurality of sub-regions of the prior map having a highest log-likelihood value; estimating a location of a vehicle that corresponds to the sub-region of the prior map having the highest log-likelihood value; and notifying a driver or performing a driving maneuver based on the location of the vehicle; wherein the sensor comprises a LIDAR sensor of the vehicle.

Example 12 is a method as in any of Examples 1-11, wherein calculating the log-likelihood for the sub-region of the prior map comprises utilizing mutual information to compare the sensor data against the sub-region of the prior map.

Example 13 is a method as in any of Examples 1-12, wherein the sensor data comprises two-dimensional raster maps comprising LIDAR intensity values.

Example 14 is a method as in any of Examples 1-13, further comprising: receiving the sensor data from a LIDAR sensor of a vehicle; receiving location data from a global positioning system of the vehicle; determining an estimated location of the vehicle by determining a sub-region of the plurality of sub-regions having the highest log-likelihood value; and parallelizing the location data from the global positioning system with the estimated location.

Example 15 is non-transitory computer readable storage media storing instructions that, when executed by one or more processors, cause the one or more processors to: receive sensor data from a sensor; determine a prior map comprising LIDAR intensity values; extract a sub-region of the prior map around a hypothesis position of the sensor; extract a Gaussian Mixture Model (GMM) distribution of intensity values for a region of the sensor data by expectation-maximization; and calculate a log-likelihood for the sub-region of the prior map based on the GMM distribution of intensity values for the sensor data.

Example 16 is non-transitory computer readable storage media as in Example 15, wherein the instructions further cause the one or more processors to: calculate a log-likelihood for each sub-region of a plurality of sub-regions of the prior map to produce a plurality of log-likelihood values; rank the plurality of log-likelihood values from a lowest log-likelihood value to a highest log-likelihood value; and estimate a position of the sensor by determining a sub-region of the plurality of sub-regions having the highest log-likelihood value; wherein a higher log-likelihood value indicates a higher probability that the corresponding sub-region of the prior map comprises the position of the sensor.

Example 17 is non-transitory computer readable storage media as in any of Examples 15-16, wherein the instructions further cause the one or more processors to extract a distribution around a highest peak for the sub-region having the highest log-likelihood value and utilizing the distribution around the highest peak as a mean for a Kalman filter.

Example 18 is non-transitory computer readable storage media as in any of Examples 15-17, wherein the instructions cause the one or more processors to extract the sub-region of the prior map around the hypothesis position of the sensor by one or more of: determining a grid overlay on the sensor data; or applying a particle filter to the sensor data; wherein the sub-region of the prior map is approximately the same size as the sensor data.

Example 19 is non-transitory computer readable storage media as in any of Examples 15-18, wherein the instructions further cause the one or more processors to: receive the sensor data from a LIDAR sensor of a vehicle; receive location data from a global positioning system of the vehicle; calculate an estimated location of the vehicle by determining the sub-region of the plurality of sub-regions having the highest log-likelihood value; parallelize the location data from the global positioning system with the estimated location of the vehicle; and notify a driver or perform a driving maneuver based on the estimated location of the vehicle.

Example 20 is a system. The system includes a vehicle comprising a LIDAR sensor. The system includes a vehicle controller in communication with the LIDAR sensor, the vehicle controller comprising non-transitory computer readable storage media storing instructions that, when executed by one or more processors, cause the one or more processors to: receive LIDAR sensor data from the LIDAR sensor; determine a prior map comprising LIDAR intensity values; extract a sub-region of the prior map around a hypothesis position of the LIDAR sensor; extract a Gaussian Mixture Model (GMM) distribution of intensity values for a region of the LIDAR sensor data by expectation-maximization; and calculate a log-likelihood for the sub-region of the prior map based on the GMM distribution of intensity values for the LIDAR sensor data.

Example 21 is a system or device that includes means for implementing a method, system, or device as in any of Examples 1-20.

In the above disclosure, reference has been made to the accompanying drawings, which form a part hereof, and in which is shown by way of illustration specific implementations in which the disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein purposes of illustration and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method for localization comprising:
   receiving a LIDAR scan from a sensor;
   retrieving historical map data comprising LIDAR intensity values;
   extracting a sub-region of the historical map data around a hypothesis position of the sensor, wherein a size of the sub-region is approximately equal to a size of the LIDAR scan;
   extracting a Gaussian Mixture Model (GMM) distribution of intensity values for the LIDAR scan by expectation-maximization; and
   calculating a log-likelihood for the sub-region of the historical map data based on the GMM distribution of intensity values for the LIDAR scan.

2. The method of claim 1, further comprising:
calculating a log-likelihood for each sub-region of a plurality of sub-regions of the historical map data to produce a plurality of log-likelihood values; and
ranking the plurality of log-likelihood values from a lowest log-likelihood value to a highest log-likelihood value;
wherein a higher log-likelihood value indicates a higher probability that the corresponding sub-region of the historical map data comprises a current position of the sensor.

3. The method of claim 2, further comprising estimating the current position of the sensor by determining the sub-region of the plurality of sub-regions having a highest log-likelihood value.

4. The method of claim 2, further comprising updating a particle weight in a particle filter based on one or more of the plurality of log-likelihood values calculated for the plurality of sub-regions of the historical map data.

5. The method of claim 3, further comprising extracting a distribution around a highest peak for the sub-region having the highest log-likelihood value and utilizing the distribution around the highest peak as a mean for a Kalman filter.

6. The method of claim 1, wherein extracting the sub-region of the historical map data around the hypothesis position of the sensor comprises one or more of:
determining a grid overlay on the LIDAR scan; or
applying a particle filter to the LIDAR scan.

7. The method of claim 1, wherein the GMM distribution of intensity values for the LIDAR scan comprises one or more of:
a weight of a distribution of current LIDAR intensity values of the LIDAR scan;
a mean of the distribution of the current LIDAR intensity values of the LIDAR scan; or
a standard deviation of the distribution of the current LIDAR intensity values of the LIDAR scan.

8. The method of claim 1, wherein extracting the GMM distribution of intensity values for the LIDAR scan comprises parameterizing the LIDAR scan as a mixture of two Gaussians utilizing a two-mixture component to solve for the GMM distribution of intensity values, wherein the two-mixture component provides a representation of road intensity data within the LIDAR scan.

9. The method of claim 1, wherein the GMM distribution of intensity values for the LIDAR scan comprises:
two values for a weight of a distribution of current LIDAR intensity values of the LIDAR scan;
two values for a mean of the distribution of the current LIDAR intensity values of the LIDAR scan; and
two values for a standard deviation of the distribution of the current LIDAR intensity values of the LIDAR scan.

10. The method of claim 1, wherein:
the extracting the GMM distribution of intensity values occurs once for each measurement by the sensor; and
the calculating the log-likelihood for the sub-region of the historical map data occurs a plurality of times for each measurement by the sensor.

11. The method of claim 2, further comprising:
determining a sub-region of the plurality of sub-regions of the historical map data having a highest log-likelihood value;
estimating a location of a vehicle that corresponds to the sub-region of the historical map data having the highest log-likelihood value; and
notifying a driver or performing a driving maneuver based on the location of the vehicle;
wherein the sensor comprises a LIDAR sensor of the vehicle.

12. The method of claim 1, wherein calculating the log-likelihood for the sub-region of the historical map data comprises utilizing mutual information to compare the LIDAR scan against the sub-region of the historical map data.

13. The method of claim 1, wherein the LIDAR scan comprises two-dimensional raster maps comprising LIDAR intensity values.

14. The method of claim 2, further comprising:
receiving the LIDAR scan from a LIDAR sensor of a vehicle;
receiving location data from a global positioning system of the vehicle;
determining an estimated location of the vehicle by determining a sub-region of the plurality of sub-regions having the highest log-likelihood value; and
parallelizing the location data from the global positioning system with the estimated location.

15. Non-transitory computer readable storage media storing instructions for execution by one or more processors, the instructions comprising:
receiving a LIDAR scan from a sensor;
retrieving historical map data comprising LIDAR intensity values;
extracting a sub-region of the historical map data around a hypothesis position of the sensor, wherein a size of the sub-region is approximately equal to a size of the LIDAR scan;
extracting a Gaussian Mixture Model (GMM) distribution of intensity values for the LIDAR scan Censor data by expectation-maximization; and
calculating a log-likelihood for the sub-region of the prior historical map data based on the GMM distribution of intensity values for the LIDAR scan.

16. The non-transitory computer readable storage media of claim 15, wherein the instructions further comprise:
calculating a log-likelihood for each sub-region of a plurality of sub-regions of the historical map data to produce a plurality of log-likelihood values;
ranking the plurality of log-likelihood values from a lowest log-likelihood value to a highest log-likelihood value; and
estimating a position of the sensor by determining a sub-region of the plurality of sub-regions having the highest log-likelihood value;
wherein a higher log-likelihood value indicates a higher probability that the corresponding sub-region of the historical map data comprises the position of the sensor.

17. The non-transitory computer readable storage media of claim 16, wherein the instructions further comprise extracting a distribution around a highest peak for the sub-region having the highest log-likelihood value and utilizing the distribution around the highest peak as a mean for a Kalman filter.

18. The non-transitory computer readable storage media of claim 15, wherein the instructions are such that extracting the sub-region of the historical map data around the hypothesis position of the sensor comprises:
determining a grid overlay on the LIDAR scan; or
applying a particle filter to the LIDAR scan.

19. The non-transitory computer readable storage media of claim 16, wherein the instructions further comprise:
receiving the LIDAR scan from a LIDAR sensor of a vehicle;

receiving location data from a global positioning system of the vehicle;

calculating an estimated location of the vehicle by determining the sub-region of the plurality of sub-regions having the highest log-likelihood value;

parallelizing the location data from the global positioning system with the estimated location of the vehicle; and notifying a driver or performing a driving maneuver based on the estimated location of the vehicle.

20. A system comprising:

a vehicle comprising a LIDAR sensor; and a vehicle controller in communication with the LIDAR sensor, the vehicle controller comprising non-transitory computer readable storage media storing instructions for execution by one or more processors, the instructions comprising:

receiving a LIDAR scan from the LIDAR sensor;

retrieving historical map data comprising LIDAR intensity values;

extracting a sub-region of the historical map data around a hypothesis position of the LIDAR sensor, wherein a size of the sub-region is approximately equal to a size of the LIDAR scan;

extracting a Gaussian Mixture Model (GMM) distribution of intensity values for the LIDAR scan by expectation-maximization; and calculating a log-likelihood for the sub-region of the historical map data based on the GMM distribution of intensity values for the LIDAR scan.

* * * * *